United States Patent
Kuboki

(10) Patent No.: US 8,617,727 B2
(45) Date of Patent: Dec. 31, 2013

(54) PERPENDICULAR MAGNETIC RECORDING MEDIUM

(75) Inventor: Yoshiyuki Kuboki, Tochigi (JP)

(73) Assignee: Fuji Electric Co., Ltd. (JP)

( * ) Notice: Subject to any disclaimer, the term of this patent is extended or adjusted under 35 U.S.C. 154(b) by 147 days.

(21) Appl. No.: 13/106,277

(22) Filed: May 12, 2011

(65) Prior Publication Data

US 2012/0021254 A1 Jan. 26, 2012

(30) Foreign Application Priority Data

Jul. 26, 2010 (JP) .................. 2010-166706

(51) Int. Cl.
*G11B 5/66* (2006.01)

(52) U.S. Cl.
USPC ...................................... 428/831.2; 428/831

(58) Field of Classification Search
None
See application file for complete search history.

(56) References Cited

U.S. PATENT DOCUMENTS

| 2002/0182446 A1 | 12/2002 | Takenoiri et al. |
| 2006/0093867 A1 | 5/2006 | Takenoiri et al. |
| 2008/0024918 A1 | 1/2008 | Gouke |
| 2008/0075979 A1 | 3/2008 | Inamura et al. |
| 2008/0096055 A1 | 4/2008 | Takenoiri et al. |
| 2009/0155627 A1* | 6/2009 | Berger et al. ............. 428/828 |
| 2010/0039730 A1 | 2/2010 | Ishibashi et al. |

FOREIGN PATENT DOCUMENTS

| JP | 2002-358617 A | 12/2002 |
| JP | 2006-120231 A | 5/2006 |
| JP | 2008-034060 A | 2/2008 |
| JP | 2008-084413 A | 4/2008 |
| JP | 2008-117506 A | 5/2008 |
| JP | 2010-044842 A | 2/2010 |

* cited by examiner

*Primary Examiner* — Holly Rickman
(74) *Attorney, Agent, or Firm* — Rossi, Kimms & McDowell LLP

(57) ABSTRACT

A perpendicular magnetic recording medium is disclosed which is capable of reducing the orientational dispersion and crystal grain size of a magnetic recording layer, simultaneously reducing the thickness of a non-magnetic intermediate layer, hence, reducing noise, and improving S/N ratio and recording density characteristics. The medium includes a non-magnetic substrate, soft magnetic underlayer, seed layer, first non-magnetic intermediate layer, second non-magnetic intermediate layer, granular magnetic recording layer, exchange coupling force control layer, non-granular magnetic recording layer, protective layer, and lubricant layer sequentially formed on the non-magnetic substrate. The first and second non-magnetic intermediate layers are laminated to form a two-layer non-magnetic intermediate layer and the seed layer is made of a material having an fcc structure.

12 Claims, 1 Drawing Sheet

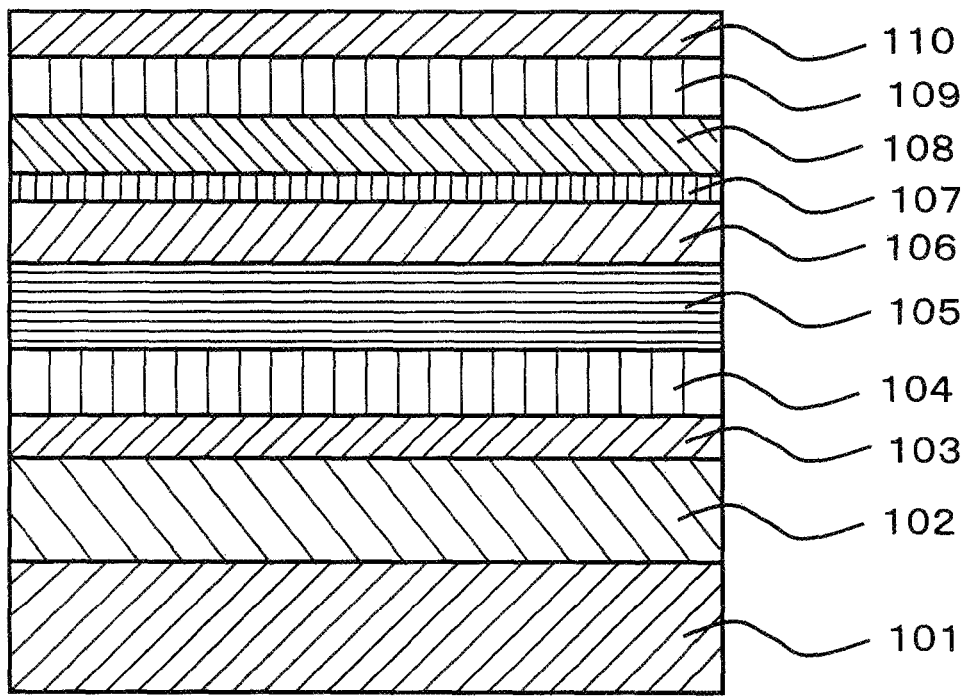

PERPENDICULAR MAGNETIC RECORDING MEDIUM

BACKGROUND OF THE INVENTION

A. Field of the Invention

The present invention relates to a perpendicular magnetic recording medium for use in various kinds of magnetic recording apparatuses. More particularly, the invention relates to a perpendicular magnetic recording medium for use in a hard disk drive used as an external storage device of, for example, a computer or an AV apparatus and is capable of achieving high-density magnetic recording.

B. Description of the Related Art

In recent years, a magnetic recording medium for use in a hard disk drive (HDD) has employed a perpendicular magnetic recording method in order to further improve recording density.

The perpendicular magnetic recording medium mainly includes a magnetic recording layer made of a hard magnetic material, a seed layer that aligns the magnetic recording layer in a desired direction, a protective layer that protects the surface of the magnetic recording layer, and an underlayer that is made of a soft magnetic material and concentrates a magnetic flux generated by a magnetic head used to record information on the magnetic recording layer.

In the perpendicular magnetic recording method, a recording bit recorded on the perpendicular magnetic recording medium is affected by the diamagnetic field of adjacent recording bits such that the stability of the magnitude of remnant magnetization is stabilized as recording density increases. As a result, the perpendicular magnetic recording medium can have high thermal fluctuation resistance.

In addition, the perpendicular magnetic recording medium includes a soft magnetic underlayer that is made of a soft magnetic material and is provided between a substrate and the magnetic recording layer. In this way, the soft magnetic underlayer sharply draws the magnetic field generated from the magnetic head. Therefore, the magnetic field gradient is reduced and the influence of the write spreading of signals is also reduced.

In order to further improve the recording density of the perpendicular magnetic recording medium, for example, it is necessary to reduce the size of a magnetic crystal grain, improve the separation performance of the magnetic crystal grain, and reduce the orientational dispersion $\Delta\theta 50$ of the c-axis which is the magnetization easy axis of the magnetic layer. The following techniques are disclosed as a means for satisfying the above mentioned conditions.

Japanese Patent Application Laid-Open (JP-A) No. 2008-34060 discloses a technique in which an orientation control layer provided below a Ru intermediate layer is made of a non-magnetic material having NiCr or NiCu as a main component to reduce the orientational dispersion $\Delta\theta 50$. JP-A No. 2010-44842 discloses a technique in which a CuTi seed layer is used as an orientation control layer to reduce the orientational dispersion $\Delta\theta 50$ even when the thickness of the layer is small. JP-A No. 2002-358617 discloses a technique in which an intermediate layer provided below a magnetic layer is made of NiFeCr, thereby improving the orientation of the magnetic recording layer. JP-A No. 2008-84413 discloses an example in which a seed layer is made of FeCoB as a material other than the above-mentioned material.

As such, many techniques for improving the recording density of the perpendicular magnetic recording medium have been proposed. However, the characteristics of the perpendicular magnetic recording medium depend on various conditions, such as the component and composition of each layer to be laminated and the order in which the layers are laminated. In the techniques according to the prior art, all of the above-mentioned conditions are not optimized, and the medium characteristics have both the advantages and the disadvantages. Therefore, in recent years, there is a demand for further improvement in the characteristics of the perpendicular magnetic recording medium.

In order to increase the signal output of the perpendicular magnetic recording medium and reduce its noise, thereby increasing the S/N ratio, it is necessary to minimize the orientational dispersion of the magnetic recording layer. In addition, in order to reduce the noise of the magnetic recording medium, it is necessary to reduce the crystal grain size of the magnetic recording layer.

The seed layer or the intermediate layer has a function of controlling, for example, the crystallinity, orientation, and crystal grain size of the magnetic recording layer formed thereon, and it has been known that the seed layer or the intermediate layer has an influence on the characteristics of the magnetic recording layer. Therefore, in order to reduce the crystal grain size of a magnetic recording layer material, it is effective to reduce the crystal grain size of the seed layer or the intermediate layer. However, it has been known that, when the thickness of the seed layer or the intermediate layer is reduced, the crystal orientation of the magnetic recording layer material is deteriorated, the magnetic separation between the magnetic crystal grains is hindered, and the magnetic characteristics of the magnetic recording layer are deteriorated. When considering the above-mentioned points, it is necessary to reduce the thickness of the seed layer or the intermediate layer while maintaining or improving the magnetic characteristics of the magnetic recording layer, not simply reducing the thickness of the seed layer or the intermediate layer.

The present invention is directed to overcoming or at least reducing the effects of one or more of the problems set forth above.

SUMMARY OF THE INVENTION

Therefore, the invention provides a perpendicular magnetic recording medium capable of reducing the orientational dispersion and crystal grain size of a magnetic recording layer and reducing the thickness of a seed layer and an intermediate layer, thereby achieving a high performance, such as a reduction in noise and an increase in the S/N ratio.

The inventors conducted a study and found that, when a seed layer, a first non-magnetic intermediate layer, and a second non-magnetic intermediate layer were sequentially formed to divide the non-magnetic intermediate layer into two layers and a seed layer material having a face-centered cubic lattice (fcc) structure was used, the orientation of a magnetic recording layer was improved, thereby achieving the invention.

According to an aspect of the invention, a perpendicular magnetic recording medium includes a non-magnetic substrate, and a soft magnetic underlayer, a seed layer, a first non-magnetic intermediate layer, a second non-magnetic intermediate layer, a granular magnetic recording layer, an exchange coupling force control layer, a non-granular magnetic recording layer, a protective layer, and a lubricant layer that are sequentially formed on the non-magnetic substrate. The seed layer is made of a material that includes NiFeCrMo as an indispensable component and at least one of Co, Si, and Ti, and has an fcc structure. The first non-magnetic intermediate layer is made of an alloy including CoCrMo or CoCr- MoRu, and the second non-magnetic intermediate layer is made of an alloy including Ru or RuW.

In the perpendicular magnetic recording medium according to the above-mentioned aspect of the invention, in the seed layer, the concentration of Cr may be in a range of 3 at % to 20 at %, the concentration of Fe may be in a range of 3 at % to 10 at %, and the concentration of Mo may be in a range of 2 at % to 8 at %. The seed layer may have a thickness of 2 nm to 10 nm. The magnetization saturation of the seed layer may be in a range of 0 emu/cc to 300 emu/cc. The non-magnetic intermediate layer may include two kinds of layers made of different materials, and the total thickness of a first layer (first non-magnetic intermediate layer) and a second layer (second non-magnetic intermediate layer) may be in a range of 10 nm to 30 nm.

According to the perpendicular magnetic recording medium of the invention, it is possible to improve the orientation of the magnetic recording layer by optimizing a material forming the seed layer and the concentration of the material and providing two non-magnetic intermediate layers. That is, in the perpendicular magnetic recording medium according to the invention, the seed layer and the first and second non-magnetic intermediate layers are adopted as components and materials forming these layers are appropriately selected. Therefore, it is possible to improve the orientation of the magnetic recording layer and obtain good electromagnetic conversion characteristics and high recording density characteristics.

BRIEF DESCRIPTION OF THE DRAWINGS

The foregoing advantages and features of the invention will become apparent upon reference to the following detailed description and the accompanying drawing. The sole FIGURE of drawing is a cross-sectional view schematically illustrating the layer structure of a perpendicular magnetic recording medium according to an embodiment of the invention.

DETAILED DESCRIPTION OF SPECIFIC EMBODIMENTS

Hereinafter, a perpendicular magnetic recording medium according to an embodiment of the invention will be described in detail with reference to the accompanying drawings.

The sole FIGURE of drawing is a cross-sectional view illustrating the perpendicular magnetic recording medium according to the embodiment of the invention. The perpendicular magnetic recording medium includes soft magnetic underlayer 102, seed layer 103, first non-magnetic intermediate layer 104, second non-magnetic intermediate layer 105, granular magnetic recording layer 106, exchange coupling force control layer 107, non-granular magnetic recording layer 108, protective layer 109, and lubricant layer 110 formed on non-magnetic substrate 101 in this order.

Various kinds of substrates that are used in a conventional magnetic recording medium and have a flat surface may be used as non-magnetic substrate 101. For example, non-magnetic substrate 101 may be made of, for example, a NiP-plated Al alloy, tempered glass, and crystalline glass. In addition, a silicon substrate may be used as non-magnetic substrate 101.

It is preferable that non-magnetic substrate 101 be cleaned before other components 102 to 110 are formed. The cleaning may be performed by a scrubbing method using a brush, a high-pressure water jetting method, and a method of dipping the substrate into an alkali detergent. After the substrate is cleaned by these methods, the substrate may be irradiated with ultraviolet rays.

Soft magnetic underlayer 102 is a component that is provided on non-magnetic substrate 101 and has a function of ensuring a sufficient perpendicular magnetic field to prevent the spreading of a magnetic flux generated from a magnetic head during the recording of information. Soft magnetic underlayer 102 may be made of a Ni alloy, an Fe alloy, or a Co alloy. In particular, soft magnetic underlayer 102 may be made of, for example, amorphous CoZrNb, CoTaZr, CoTaZrNb, CoFeZrNb, CoFeNiZrNb, CoFeTaZrNb, or CoFeTaZr in order to obtain good electromagnetic conversion characteristics.

The thickness of soft magnetic underlayer 102 may be appropriately designed and changed depending on the structure and/or characteristics of the magnetic head used to record information. However, it is preferable that the thickness of soft magnetic underlayer 102 be in the range of 10 nm to 100 nm in terms of productivity. When the thickness is equal to or greater than 10 nm, it is possible to ensure a sufficient perpendicular magnetic field. When the thickness is equal to or less than 100 nm, it is possible to improve productivity.

Seed layer 103 is a component that appropriately controls the orientation and grain size of the first non-magnetic intermediate layer 104 formed thereon and the orientation of second non-magnetic intermediate layer 105 to obtain good perpendicular orientation of granular magnetic recording layer 106.

It is preferable that the crystal structure of seed layer 103 be a face-centered cubic lattice (fcc) structure in order to make seed layer 103 sufficiently perform the above-mentioned function. The reason is as follows. The crystal structure of first non-magnetic intermediate layer 104, second non-magnetic intermediate layer 105, granular magnetic recording layer 106, and non-granular magnetic recording layer 108 is a hexagonal close-packed (hcp) structure, which is one kind of close-packed structure (filling rate: 74%) of atoms. Therefore, two intermediate layers 104 and 105 and two magnetic recording layers 106 and 108 can have good orientation, by adopting fcc crystal structure for seed layer 103 provided below layers 104 and 105, which is one kind of close-packed structure of the atoms.

The fcc structure used in seed layer 103 is made of NiFeCrMo. In addition, the fcc structure may be made of a material including at least one of Co, Si, and Ti. For example, the fcc structure may be made of NiFeCrMoTi, NiFeCrMoSi, NiFeCoCrMo, or NiFeCoCrMoTi. It is considered that the selected Co, Si, or Ti is capable of reducing the grain size.

The thickness of seed layer 103 may be appropriately designed and changed such that the magnetic characteristics and/or electromagnetic conversion characteristics of magnetic recording layers 106 and 108 have desired values. In particular, it is preferable that the thickness of seed layer 103 be in the range of 2 nm to 10 nm. When the thickness is equal to or greater than 2 nm, it is possible to sufficiently ensure the crystallinity of seed layer 103 and improve the orientation of each of layers 104 to 108 provided on seed layer 103. As a result, it is possible to improve the signal-to-noise ratio (S/N ratio) of the perpendicular magnetic recording medium. When the thickness is equal to or less than 10 nm, it is possible to prevent an increase in the grain size of seed layer 103 and sequentially prevent an increase in the grain size of each of layers 104 to 108 provided on seed layer 103. Therefore, it is possible to obtain a high S/N ratio.

It is preferable that the magnetization saturation (Ms) of seed layer 103 be in the range of 0 emu/cc to 300 emu/cc.

When the Ms is equal to or less than 300 emu/cc, the magnetization of the seed layer does not become a noise source and it is possible to improve a writing performance. When the Ms is greater than 300 emu/cc, the writing performance is further improved, but the S/N ratio is reduced due to noise generated from the seed layer.

Intermediate layers 104 and 105 are components that improve the orientation of magnetic recording layers 106 and 108 and control the grain sizes of layers 106 and 108. As described above, two intermediate layers are formed in order to sufficiently achieve the functions of the intermediate layers. First non-magnetic intermediate layer 104 is made of an alloy including CoCrMo or CoCrMoRu. Second non-magnetic intermediate layer 105 is made of an alloy including Ru or RuW.

When two intermediate layers are formed as described above, it is possible to reduce the thickness of each of the two intermediate layers, as compared to the structure in which a single intermediate layer is formed with the same thickness as the total thickness of the two intermediate layers. Therefore, it is easy to reduce the grain size. It is preferable that the total thickness of intermediate layers 104 and 105 be in the range of 10 nm to 30 nm. When the total thickness is equal to or greater than 10 nm, the crystallinity of intermediate layers 104 and 105 is improved and it is possible to achieve good orientation. Therefore, magnetic recording layers 106 and 108 provided on intermediate layers 104 and 105 have good orientation and good crystal grain separation.

When the total thickness of intermediate layers 104 and 105 is equal to or less than 30 nm, it is possible to prevent an increase in the grain sizes of intermediate layers 104 and 105 and thus prevent an increase in the grain sizes of magnetic recording layers 106 and 108. As a result, it is possible to obtain a high S/N ratio due to a reduction in the noise of magnetic recording layers 106 and 108.

Granular magnetic recording layer 106 is a component that is provided in order to record information. When granular magnetic recording layer 106 is used as a component of the perpendicular magnetic recording medium, the magnetization easy axis needs to be oriented in a direction perpendicular to the surface of the substrate. Specifically, it is preferable that the hcp (0002) plane be oriented in parallel to the surface of the substrate. It is preferable that magnetic recording layer 106 have a so-called granular structure in which non-magnetic crystal grains having an oxide as a main component surround a ferromagnetic crystal grain made of a Co-based alloy. When magnetic recording layer 106 has the granular structure, it is possible to obtain sufficient electromagnetic conversion characteristics of magnetic recording layer 106 and thus obtain a high S/N ratio due to a reduction in the noise of the magnetic recording medium. The term "having an oxide as a main component" means that including a very small amount of other components is not hindered and the content of the oxide in the non-magnetic crystal grain is about 90 mol % or more.

Examples of the Co-based alloy forming the ferromagnetic crystal grain include a CoPt-based alloy, such as CoPtCr, CoPt, CoPtSi, or CoPtCrB, and a CoCr-based alloy, such as CoCr, CoCrTa, or CoCrTaPt. Among them, the CoPt-based alloy is preferable in terms of the setting of high magnetic anisotropic energy (Ku).

Examples of the oxide forming the non-magnetic crystal grain include $SiO_2$, $Cr_2O_3$, $ZrO_2$, and $Al_2O_3$ having high capability to magnetically separate ferromagnetic crystal grains from the Co-based alloy. Among them, SiO2 is preferable since it has high capability to magnetically separate the ferromagnetic crystal grains from the Co-based alloy.

The exchange coupling force control layer 107 is provided between the granular magnetic recording layer 106 and the non-granular magnetic recording layer 108 and weakens exchange coupling energy to reduce a reversal magnetic field with little deterioration of thermal stability, thereby improving writing characteristics.

Examples of the material forming the exchange coupling force control layer include Ru, RuCo, RuCr, and NiCr. The optimal thickness of the exchange coupling force control layer varies depending on the material used, but it is preferable that the thickness of the exchange coupling force control layer be in the range of 0.07 nm to 0.8 nm. When the thickness is less than 0.07 nm, granular magnetic recording layer 106 and non-granular magnetic recording layer 108 are ferromagnetically coupled to each other, and the writing characteristics deteriorate. When the thickness is greater than 0.8 nm, granular magnetic recording layer 106 and non-granular magnetic recording layer 108 are magnetically disconnected from each other, which results in the deterioration of thermal stability.

Non-granular magnetic recording layer 108 is a component that is provided on exchange coupling force control layer 107 in order to improve the durability of the magnetic recording medium and appropriately controls the overall magnetic characteristics of magnetic recording layers 106 and 108. When non-granular magnetic recording layer 108 is used as a component of the perpendicular magnetic recording medium, it is preferable that non-granular magnetic recording layer 108 have a structure including ferromagnetic crystal grains made of a Co-based alloy and non-magnetic crystal grains of metal that does not include metal oxide and nitride. When the non-granular structure is used, it is possible to block Co atoms eluted from the non-magnetic crystal grain boundary of granular magnetic recording layer 106, improve the durability of the magnetic recording medium, and control the overall magnetic characteristics of magnetic recording layer 106 and 108 to be good.

The non-magnetic crystal grain boundary may be made of at least one of Ta, Pt, B, Si, Nb, Cu, and Ti. Among them, particularly, B is preferable since it has high capability to magnetically separate ferromagnetic crystal grains made of the Co-based alloy.

Protective layer 109 is a component that is provided in order to protect each of layers 102 to 108 disposed below layer 109 in the cross-sectional view of the magnetic recording medium in the drawing FIGURE and particularly prevent the elution of Co from soft magnetic underlayer 102. Protective layer 109 may be made of a material that is generally used in the perpendicular magnetic recording medium. For example, protective layer 109 may be made of various kinds of thin film materials that have been used to form a protective layer (preferably, diamond-like carbon) having carbon, such as diamond-like carbon (DLC) or amorphous carbon, as a main component or a protective layer of the magnetic recording medium. Protective layer 109 may have a thickness that is generally used as the thickness of a component of the perpendicular magnetic recording medium.

Lubricant layer 110 is an optional component and is provided in order to reduce frictional force between protective layer 109 and the head (not shown in the drawing FIGURE) and improve the durability and reliability of the magnetic recording medium. Lubricant layer 110 may be made of a material that is generally used in the magnetic recording medium. For example, lubricant layer 110 is made of a perfluoropolyether-based lubricant. Lubricant layer 110 may have a thickness that is generally used as the thickness of a component of the perpendicular magnetic recording medium.

Each layer formed on non-magnetic substrate 101 may be formed by various kinds of deposition techniques that are generally used in the field of the magnetic recording media. Each layer from soft magnetic underlayer 102 to protective layer 109 may be formed by, for example, a sputtering method (including, for example, a DC magnetron sputtering method and an RF magnetron sputtering method) and a vapor deposition method. In addition, protective layer 109 may be formed by a CVD method in addition to the above-mentioned methods. Lubricant layer 110 may be formed by any coating method, such as a dip-coating method or a spin coating method that has been known in the technical field.

Next, the effects of the invention are verified by examples. The following examples are just representative examples of describing the invention, and do not limit the scope of the invention.

EXAMPLE 1

A magnetic recording medium having the structure shown in the FIGURE was manufactured. A chemically tempered glass substrate (N-5 glass substrate manufactured by HOYA Corporation) with a diameter of 65 mm and a thickness of 0.635 mm was prepared as non-magnetic substrate 101. The substrate was cleaned and then put into a sputtering apparatus. Then, a Co27Fe4Zr6Nb (a number in the chemical formula indicates the atom ratio of an element subsequent to the number; in this example, the numbers indicate that Fe is 27 at %, Zr is 4 at %, Nb is 6 at %, and the remainder is Co, which is similar to the following description) target was used to form soft magnetic underlayer 102 made of CoFeZrNb with a thickness of 50 nm.

Then, a Ni7Fe7Cr3Mo3Ti target was used to form seed layer 103 with a thickness of 4 nm at an Ar gas pressure of 5 Pa. Then, a Co30Cr5Mo target was used to form first non-magnetic intermediate layer 104 with a thickness of 14 nm at an Ar gas pressure of 2 Pa. Then, a Ru target was used to form second non-magnetic intermediate layer 105 with a thickness of 8 nm at an Ar gas pressure of 15 Pa.

A target including 90 mol % of (Co8Cr20Pt) and 7 mol % of $SiO_2$ was used to form the granular magnetic recording layer 106 with a thickness of 7 nm at an Ar gas pressure of 4.0 Pa. Then, a Ru target was used to form the exchange coupling force control layer 107 with a thickness of 0.130 nm at an Ar gas pressure of 4.0 Pa. Then, a Co18Cr12Pt4B3Cu target was used to form non-granular magnetic recording layer 108 with a thickness of 5 nm at an Ar gas pressure of 0.7 Pa. Each of layers 102 to 108 was formed by the DC magnetron sputtering method.

Then, protective layer 109 made of carbon was formed with a thickness of 2.5 nm by the CVD method, and the laminate was taken out from the vacuum apparatus. Then, liquid lubricant layer 110 made of perfluoropolyether was formed with a thickness of 1.0 nm on the obtained laminate by a dip method. In this way, a perpendicular magnetic recording medium according to Example 1 was manufactured.

EXAMPLE 2

A perpendicular magnetic recording medium according to Example 2 was manufactured similar to Example 1 except that seed layer 103 was formed using a Ni7Fe3Cr3Mo3Ti target.

EXAMPLE 3

A perpendicular magnetic recording medium according to Example 3 was manufactured similar to Example 1 except that seed layer 103 was formed using a Ni5Fe5Cr5Mo1Si target.

EXAMPLE 4

A perpendicular magnetic recording medium according to Example 4 was manufactured similar to Example 1 except that seed layer 103 was formed using a Ni5Co5Fe8Cr5Mo5Ti target.

EXAMPLE 5

A perpendicular magnetic recording medium according to Example 5 was manufactured similar to Example 1 except that first non-magnetic intermediate layer 104 was formed using a Co28Cr5Mo5Ru target.

EXAMPLE 6

A perpendicular magnetic recording medium according to Example 6 was manufactured similar to Example 1 except that second non-magnetic intermediate layer 105 was formed using a Ru5W target.

COMPARATIVE EXAMPLE 1

A perpendicular magnetic recording medium according to Comparative example 1 was manufactured similar to Example 1 except that seed layer 103 was formed using a Ni25Cr5Mo target.

COMPARATIVE EXAMPLE 2

A perpendicular magnetic recording medium according to Comparative example 2 was manufactured similar to Example 1 except that seed layer 103 was formed using a Ni30Fe5Cr5Mo3Ti target.

COMPARATIVE EXAMPLE 3

A perpendicular magnetic recording medium according to Comparative example 3 was manufactured similar to Example 1 except that seed layer 103 was formed using a Ni5Fe5Cr15Mo3Ti target.

COMPARATIVE EXAMPLE 4

A perpendicular magnetic recording medium according to Comparative example 4 was manufactured similar to Example 1 except that the first non-magnetic intermediate layer was not formed.

Evaluation Items

For the perpendicular magnetic recording media according to Examples 1 to 5 and Comparative examples 1 to 4, the S/N ratio and overwrite characteristics (O/W characteristics) of the perpendicular magnetic recording media, the orientational dispersion $\Delta\theta 50$ and crystal grain size of the magnetic recording layer 106, and the magnetization saturation (Ms) of seed layer 103 were evaluated.

For the characteristics related to the S/N ratio, SNRm of the media (reproduction signal output S: the peak value of output in the magnetization reversal of an isolated pulse waveform at a linear recording density of 716 kFCI, and Nm: an RMS value (Root Mean Square-Inch) at 60 kFCI) was evaluated. The SNRm was evaluated by a method which wrote signals using a single magnetic pole head and read signals using an MR head. The reproduction signal output S is one half of the difference between the maximum value and the minimum value of the output, and it is preferable that the reproduction signal output S be as large as possible. Table 1 shows the evaluation result of SNRm.

The O/W characteristics were evaluated by the same spin-stand tester and a value when a 45-kFCI signal was overwritten on a 340-kFCI signal was used.

θ-2θ measurement was performed on the orientational dispersion $\Delta\theta 50$ of the magnetic recording layer 106 using an X-ray diffractometer, and a 2θ value was measured from the peak top of the hcp (0002) plane of magnetic recording layer 106 parallel to non-magnetic substrate 101. Then, the orientational dispersion $\Delta\theta 50$ was calculated as the half width of the peak when 2θ0 was fixed and θ scanning was performed. The orientational dispersion $\Delta\theta 50$ is an index indicating the dispersion of the magnetization easy axis and it is preferable that the orientational dispersion $\Delta\theta 50$ be as small as possible. Table 1 also shows the evaluation result of the orientational dispersion $\Delta\theta 50$ of magnetic recording layer 106.

The crystal grain size of magnetic recording layer 106 was measured by tracing the outline of a crystal grain on the basis of the photograph captured by a transmission electron microscope at a magnification of 500,000. Table 1 also shows the evaluation result of the crystal grain size.

The magnetization of seed layer 103 was measured as follows: a separate sample having only the seed layer formed with a thickness of 20 nm was prepared and the magnetization of the seed layer was measured by a vibrating sample magnetometer (VSM). Table 1 also shows the evaluation result of the measured magnetization saturation.

As can be seen from Table 1, in each of Examples 1 to 6 in the scope of the invention, SNRm is large, the orientational dispersion $\Delta\theta 50$ of the magnetic recording layer is small, the crystal grain size is small, and the Ms of the seed layer is in the range of 0 emu/cc to 300 emu/cc. Therefore, the evaluation results for all items are good. In particular, Examples 2, 4, and 5 have an S/N ratio or O/W characteristics more than that of Example 1.

In Examples 2 and 4, the O/W characteristics are better than those in Example 1, but the values of the other items are equal to those in Example 1. It is considered that this is because the content of Fe, Cr, and Co is adjusted and a magnetic seed material is used. Example 5 is an example in which Ru is added to the first non-magnetic intermediate layer. In Example 5, the grain size is reduced and the S/N ratio is improved with the reduction in the grain size. It is considered that Ru is effective in reducing the grain size. Example 6 is an example in which W is added to the second non-magnetic intermediate layer and has substantially the same characteristics as those of Example 1.

In contrast, in each of Comparative examples 1 to 4 beyond the scope of the invention, the evaluation result of at least one of SNRm, the orientational dispersion $\Delta\theta 50$ of the magnetic recording layer, and the crystal grain size is not good.

Specifically, in Comparative example 1, the seed material does not include Fe and Ti, $\Delta\theta 50$ is small, and the S/N ratio is low, unlike Example 1. In Comparative example 2 that includes a large amount of Fe, $\Delta\theta 50$ is improved. Therefore, it is considered that the effect of improving the orientational dispersion is mainly obtained by the addition of Fe.

In Comparative example 2, as described above, the concentration of Fe is higher than that in Example 1. In Comparative example 2, the orientational dispersion and O/W characteristics are improved, but the S/N ratio is reduced. It is considered that this is because the Ms of the seed layer increases due to an increase in the concentration of Fe and the noise of the seed layer increases.

Comparative example 3 is an example in which the amount of Mo added is more than that in Example 1. In Comparative example 3, the orientational dispersion is improved, but the grain size increases and the S/N ratio is reduced. It is considered that the addition of an excessive amount of Mo causes an increase in the grain size.

Comparative example 4 is an example in which the first non-magnetic intermediate layer is not provided, unlike Example 1. Since the total thickness of the seed layer and the intermediate layer is reduced, the O/W characteristics are improved, but the orientational dispersion and the S/N ratio deteriorate. This shows that the first non-magnetic intermediate layer made of CoCrMo is needed in order to maintain the orientation of the Ru layer (second non-magnetic intermediate layer) with a thickness of 8 nm.

TABLE 1

|  | S/N (dB) | O/W (dB) | Grain size (nm) | $\Delta\theta 50$ (deg) | Ms of seed layer (emu/cc) |
|---|---|---|---|---|---|
| Example 1 | 10.5 | 32 | 6 | 2.5 | 0 |
| Example 2 | 10.4 | 34 | 6.2 | 2.55 | 87 |
| Example 3 | 10.2 | 31 | 6.2 | 2.77 | 0 |
| Example 4 | 10.3 | 33 | 6.3 | 2.7 | 68 |
| Example 5 | 10.7 | 34 | 5.5 | 2.75 | 0 |
| Example 6 | 10.4 | 33 | 6.2 | 2.6 | 0 |
| Comparative example 1 | 10 | 31 | 6.4 | 3.2 | 0 |
| Comparative example 2 | 9.5 | 38 | 6.5 | 2.3 | 44.3 |
| Comparative example 3 | 9.7 | 31.5 | 7.5 | 2.2 | 0 |
| Comparative example 4 | 9.3 | 39 | 6.4 | 3.4 | 0 |

In the perpendicular magnetic recording medium according to the invention, the seed layer and the first non-magnetic intermediate layer are made of predetermined materials. Therefore, it is possible to improve SNRm and the orientational dispersion $\Delta\theta 50$ of the magnetic recording layer. In this way, it is possible to improve the recording density of the perpendicular magnetic recording medium. The invention is useful in that it can be applied to the field of the perpendicular magnetic recording medium whose recording density needs to be further improved.

Thus, a perpendicular magnetic recording medium has been described according to the present invention. Many modifications and variations may be made to the techniques and structures described and illustrated herein without departing from the spirit and scope of the invention. Accordingly, it should be understood that the methods and devices described herein are illustrative only and are not limiting upon the scope of the invention.

This application is based on and claims priority to Japanese Patent Application 2010-166706, filed on Jul. 26, 2010. The disclosure of the priority application in its entirety, including the drawings, claims, and the specification thereof, is incorporated herein by reference.

What is claimed is:

1. A perpendicular magnetic recording medium comprising:
    a non-magnetic substrate; and
    a soft magnetic underlayer, a seed layer, a first non-magnetic intermediate layer, a second non-magnetic intermediate layer, a granular magnetic recording layer, an exchange coupling force control layer, a non-granular magnetic recording layer, a protective layer, and a lubricant layer that are sequentially formed on the non-magnetic substrate, wherein the seed layer is made of a material that includes NiFeCrMo and at least one of Co, Si, and Ti, and has an fcc structure, the first non-magnetic intermediate layer is made of an alloy including CoCrMo or CoCrMoRu, and the second non-magnetic intermediate layer is made of an alloy including Ru or RuW, wherein the second non-magnetic intermediate layer is formed directly on the first non-magnetic intermediate layer made of an alloy.

2. A perpendicular magnetic recording medium comprising:

a non-magnetic substrate; and a soft magnetic underlayer, a seed layer, a first non-magnetic intermediate layer, a second non-magnetic intermediate layer, a granular magnetic recording layer, an exchange coupling force control layer, a non-qranular magnetic recording layer, a protective layer, and a lubricant layer that are sequentially formed on the non-magnetic substrate, wherein the seed layer is made of a material that includes NiFeCrMo and at least one of Co, Si, and Ti, and has an fcc structure, the first non-magnetic intermediate layer is made of an alloy including CoCrMo or CoCrMoRu, and the second non-magnetic intermediate layer is made of an alloy including Ru or RuW wherein, in the seed layer, the concentration of Cr is in a range of 3 at % to 20 at %, the concentration of Fe is in a range of 3 at % to 10 at %, and the concentration of Mo is in a range of 2 at % to 8 at %.

3. The perpendicular magnetic recording medium according to claim 2, wherein the seed layer has a thickness of 2 nm to 10 nm.

4. The perpendicular magnetic recording medium according to claim 2, wherein the magnetization saturation of the seed layer is in a range of 0 emu/cc to 300 emu/cc.

5. The perpendicular magnetic recording medium according to claim 1, wherein the total thickness of the first non-magnetic intermediate layer and the second non-magnetic intermediate layer is in a range of 10 nm to 30 nm.

6. The perpendicular magnetic recording medium according to claim 3, wherein the soft magnetic underlayer comprises amorphous CoZrNb, CoTaZr, CoTaZrNb, CoFeZrNb, CoFeNiZrNb, CoFeTaZrNb, or CoFeTaZr and has a thickness of 10 nm to 100 nm.

7. The perpendicular magnetic recording medium according to claim 6, wherein the exchange coupling force control layer comprises Ru, RuCo, RuCr, or NiCr and has the thickness of 0.07 nm to 0.8 nm.

8. The perpendicular magnetic recording medium according to claim 1, wherein the first non-magnetic intermediate layer has hcp structure.

9. The perpendicular magnetic recording medium according to claim 1, wherein the, second non-magnetic intermediate layer has hcp structure.

10. The perpendicular magnetic recording medium according to claim 1, wherein the granular magnetic recording layer has hcp structure.

11. The perpendicular magnetic recording medium according to claim 1, wherein the non-granular magnetic recording layer has hcp structure.

12. The perpendicular magnetic recording medium according to claim 1, wherein the first non-magnetic intermediate layer, second non-magnetic intermediate layer, granular magnetic recording layer, and non-granular magnetic recording layer all have hcp structure.

\* \* \* \* \*